United States Patent
Krishnaswamy et al.

(10) Patent No.: US 11,540,170 B2
(45) Date of Patent: Dec. 27, 2022

(54) LOAD-TESTING A CLOUD RADIO ACCESS NETWORK

(71) Applicant: CommScope Technologies LLC, Hickory, NC (US)

(72) Inventors: Vijayaraghavan Krishnaswamy, Bengaluru (IN); Kesava Rao Vetapalem, Bengaluru (IN); Manik Gulati, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 106 days.

(21) Appl. No.: 16/865,942

(22) Filed: May 4, 2020

(65) Prior Publication Data
US 2020/0374751 A1    Nov. 26, 2020

Related U.S. Application Data

(60) Provisional application No. 62/850,450, filed on May 20, 2019.

(51) Int. Cl.
*H04L 1/24* (2006.01)
*H04L 43/50* (2022.01)
(Continued)

(52) U.S. Cl.
CPC .......... *H04W 28/06* (2013.01); *H04B 17/318* (2015.01); *H04B 17/3912* (2015.01);
(Continued)

(58) Field of Classification Search
None
See application file for complete search history.

(56) References Cited

U.S. PATENT DOCUMENTS

| 2012/0155446 A1* | 6/2012 | Machida | H04W 52/0232 370/338 |
| 2014/0026123 A1* | 1/2014 | Dhanapal | G06F 11/3664 717/124 |

(Continued)

FOREIGN PATENT DOCUMENTS

JP    2013511935 A    4/2013

OTHER PUBLICATIONS

"LTE—Easiest approach", LTE—RACH Procedure, Aug. 18, 2015, pp. 1-3.
3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, pp. 1-91, 3rd Generation Partnership Project.

(Continued)

*Primary Examiner* — Ajit Patel
(74) *Attorney, Agent, or Firm* — Fogg & Powers LLC

(57) ABSTRACT

A system for load-testing a cloud radio access network (C-RAN) is provided. The system includes at least one radio point (RP), each being configured to exchange radio frequency (RF) signals with at least one user equipment (UE). The system also includes a baseband controller communicatively coupled to the at least one RP via a front-haul ETHERNET network. The front-haul ETHERNET network includes at least one switch; and a testing device that is time-synchronized to the baseband controller and the at least one RP. The testing device is configured to receive at least one packet from each of the at least one RP. The testing device is also configured to replicate each of at least some of the received packets to produce a respective replicated packet. The testing device is also configured to transmit at least one replicated packet to the baseband controller.

34 Claims, 5 Drawing Sheets

(51) Int. Cl.
*H04W 28/06* (2009.01)
*H04W 24/02* (2009.01)
*H04W 88/08* (2009.01)
*H04W 84/18* (2009.01)
*H04W 74/08* (2009.01)
*H04J 3/06* (2006.01)
*H04L 45/16* (2022.01)
*H04L 1/08* (2006.01)
*H04L 5/00* (2006.01)
*H04B 17/318* (2015.01)
*H04B 17/391* (2015.01)
*H04W 76/27* (2018.01)

(52) U.S. Cl.
CPC .............. *H04J 3/0667* (2013.01); *H04L 1/08* (2013.01); *H04L 5/0048* (2013.01); *H04L 45/16* (2013.01); *H04W 24/02* (2013.01); *H04W 74/0833* (2013.01); *H04W 76/27* (2018.02); *H04W 84/18* (2013.01); *H04W 88/085* (2013.01)

(56) References Cited

U.S. PATENT DOCUMENTS

| | | | |
|---|---|---|---|
| 2014/0031049 A1* | 1/2014 | Sundaresan | H04W 84/042 455/447 |
| 2014/0310418 A1* | 10/2014 | Sorenson, III | H04L 67/1002 709/226 |
| 2016/0234832 A1 | 8/2016 | Hebert et al. | |
| 2017/0257151 A1* | 9/2017 | Lange | H04B 7/04 |
| 2017/0373890 A1* | 12/2017 | Fertonani | H04L 69/04 |
| 2018/0070254 A1 | 3/2018 | Hannan et al. | |
| 2018/0231731 A1 | 8/2018 | Bakatsias et al. | |
| 2018/0324642 A1* | 11/2018 | Yu | H04L 5/0053 |
| 2019/0007246 A1 | 1/2019 | Fertonani et al. | |
| 2019/0208575 A1* | 7/2019 | Barbieri | H04W 88/085 |

OTHER PUBLICATIONS

International Searching Authority, "International Search Report and Written Opinion from PCT Application No. PCT/US2020/031307 dated Aug. 13, 2020", From PCT Counterpart of U.S. Appl. No. 16/865,942; pp. 1 through 11; Published in WO.

* cited by examiner

LOAD-TESTING A CLOUD RADIO ACCESS NETWORK

CROSS-REFERENCE TO RELATED APPLICATIONS

This application claims priority to U.S. Provisional Patent Application No. 62/850,450 entitled "LOAD-TESTING A CLOUD RADIO ACCESS NETWORK" filed on May 20, 2019, which is incorporated by reference in its entirety.

BACKGROUND

A cloud radio access network (C-RAN) is one way to implement base station functionality. Typically, for each cell implemented by a C-RAN, one or more baseband units interact with multiple remote units (also referred to here as "radio points" or "RPs") in order to provide wireless service to various items of user equipment (UEs). It is desirable to load-test a C-RAN in a way that is cost-effective and time-effective.

SUMMARY

A system for load-testing a cloud radio access network (C-RAN) is described. The system includes at least one radio point (RP), each being configured to exchange radio frequency (RF) signals with at least one user equipment (UE). The system also includes a baseband controller communicatively coupled to the at least one RP via a front-haul ETHERNET network. The front-haul ETHERNET network includes at least one switch; and a testing device that is time-synchronized to the baseband controller and the at least one RP. The testing device is configured to receive at least one packet from each of the at least one RP. The testing device is also configured to replicate each of at least some of the received packets to produce a respective replicated packet. The testing device is also configured to transmit at least one replicated packet to the baseband controller.

In some configurations, the testing device is further configured to perform limited simulation where it generates at least one RACH and/or at least one SRS packet that it sends to the baseband controller. In some configurations, during limited simulation, the testing device also generates at least one PTP packet (unrelated to LTE or 5G) that it sends to the baseband controller.

In some configurations, the testing device is further configured to perform full simulation where it generates at least one RACH and/or at least one SRS packet that it sends to the baseband controller. In some configurations, full simulation further includes receiving at least one response packet, from the baseband controller, that was generated in response to the at least one RACH request packet; generating at least one additional packet in response to the response packet; and sending the at least one additional packet to the baseband controller, after which the testing device and the baseband controller can optionally exchange further fronthaul messages to simulate protocol stack transactions between UE(s) and the eNB (implemented, in part, by the baseband controller). In some configurations, the at least one response packet is a Radio Resource Control (RRC) random access response packet. In some configurations, the at least one additional packet is a Physical Uplink Shared Channel (PUSCH) in-phase and quadrature (IQ) message. In some configurations, during full simulation, the testing device also generates at least one PTP packet (unrelated to LTE or 5G) that it sends to the baseband controller.

A method for load-testing a cloud radio access network (C-RAN) system is also described. The method includes receiving at least one packet from each of at least one radio point (RP). The testing device is communicatively coupled to the at least one RP via at least one switch in a front-haul network. The method also includes replicating each of at least some of the received packets to produce a respective replicated packet. The method also includes transmitting at least one replicated packet to a baseband controller.

In some configurations, the method includes performing limited simulation, which includes generating at least one RACH and/or at least one SRS packet that is/are sent to the baseband controller. In some configurations, the limited simulation also includes generating at least one PTP packet (unrelated to LTE or 5G) that is/are sent to the baseband controller.

In some configurations, the method further includes performing full simulation, which includes generating at least one RACH and/or at least one SRS packet that is/are sent to the baseband controller. In some configurations, full simulation further includes receiving at least one response packet, from the baseband controller, that was generated in response to the at least one RACH request packet; generating at least one additional packet in response to the response packet; and sending the at least one additional packet to the baseband controller, after which the testing device and the baseband controller can optionally exchange further fronthaul messages to simulate protocol stack transactions between UE(s) and the eNB (implemented, in part, by the baseband controller). In some configurations, the at least one response packet is a Radio Resource Control (RRC) random access response packet. In some configurations, the at least one additional packet is a Physical Uplink Shared Channel in-phase and quadrature (PUSCH-IQ) message. In some configurations, the full simulation also includes generating at least one PTP packet (unrelated to LTE or 5G) that is/are sent to the baseband controller.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

In many LTE deployments, in-building coverage is provided using small cell products and/or using a cloud radio access network (C-RAN). Small cell products cover smaller areas, so they are deployed more densely. Such dense small-cell solution creates multiple border areas between themselves and cause lots of handovers and eventually causing heavy signal degradation and poorer service.

With a C-RAN, an entire site is covered using a single cell, so there's no signal degradation in the border areas, which ensures high signal to interference plus noise (SINR) levels. Such C-RAN solutions provide a uniform single-cell coverage over a large area, e.g., inside a building or other site that is partially indoors. In C-RAN systems, the Layer-1 baseband processing may be split between a baseband controller unit and a set of up to X remote radio points (RPs), e.g., where X=32, 64, 96 etc. A C-RAN may host up to hundreds of UE devices or more, e.g., similar to a high-capacity, carrier-grade macro cell. An example of a C-RAN architecture is described in more detail below.

The term "load-testing" in the context of a C-RAN refers to testing at least one aspect or component of the C-RAN, e.g., under high stress or maximum simulated conditions. For example, the front-haul network between the baseband controller and the RPs (as well as the baseband controller's capabilities) may be tested at a maximum (or near maximum) packet rate. The difficulties of load-testing such complex C-RAN systems are described herein, as well as how cost, time and management efficiencies can be achieved by the systems and methods described herein.

For example, a testing device may be located between the baseband controller and the RPs. In order to load-test a front-haul interface (and the physical layer functionality) of the C-RAN under a simulated full load, the testing device may perform (1) replication of incoming traffic from the RPs (with or without modification from the incoming traffic); (2) modification of incoming traffic (from the baseband controller or RPs); (3) limited simulation of new packets (where the RP 106 is simulated, but not the full UE stack); and/or (4) full simulation of RPs 106 and UEs 110.

C-RAN Basics

Figure 1:
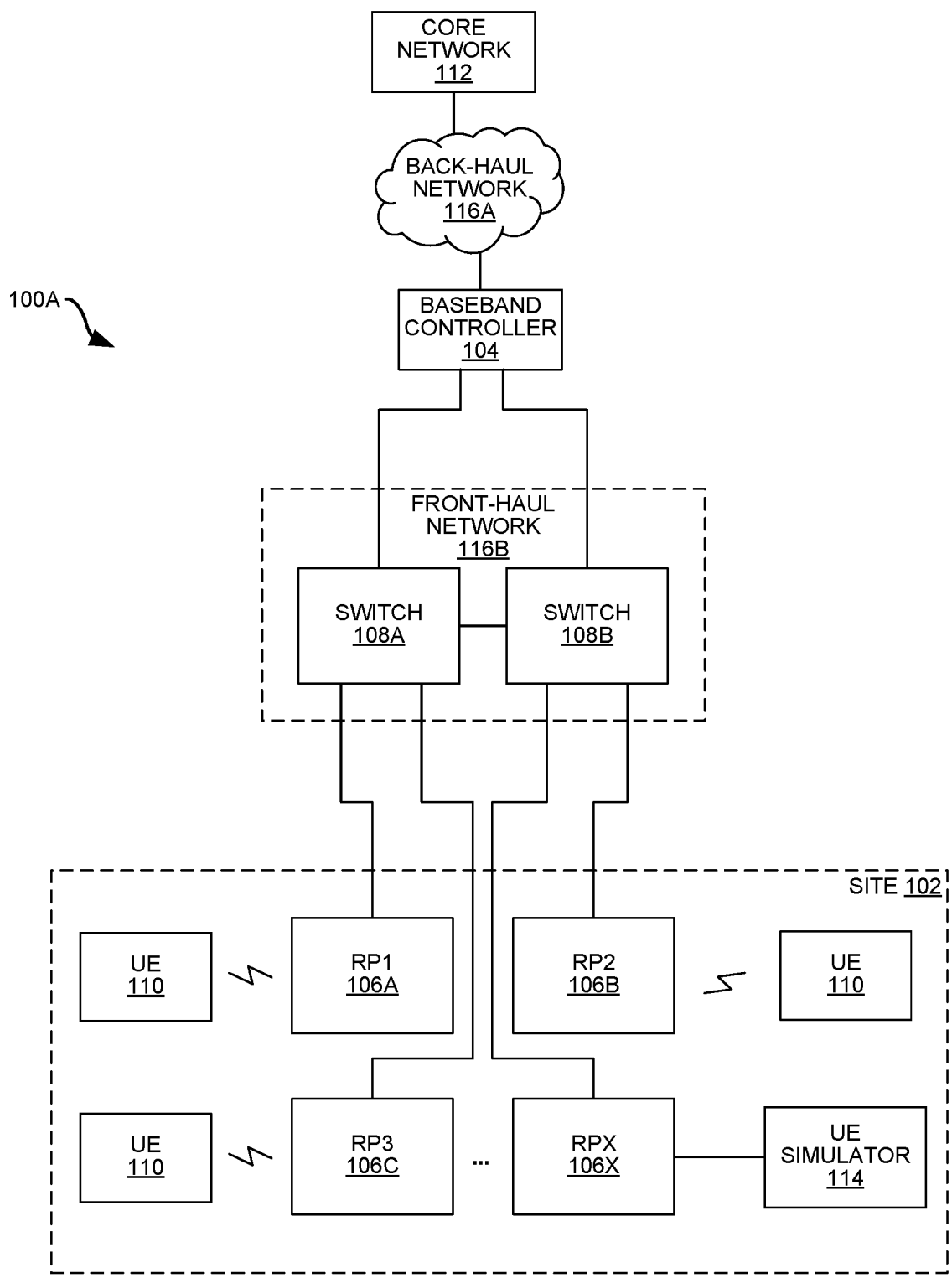
FIG. 1 is a block diagram illustrating an exemplary configuration for load-testing a cloud radio access network (C-RAN) system.

FIG. 1 is a block diagram illustrating an exemplary configuration for load-testing a cloud radio access network (C-RAN) system 100A. In the exemplary configuration shown in FIG. 1, the system 100A is implemented using the cloud radio access network (C-RAN) (point-to-multipoint distributed base station) architecture that employs at least one (and optionally multiple) baseband unit 104 and multiple (e.g., X=32, 64, 96, etc.) radio points (RPs) 106A-X that serve at least one cell. In 3GPP Fifth Generation (5G) examples, an RP 106 can implement a Digital Unit (DU) and/or a Radio Unit (RU).

The RPs 106 may be deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). In some configurations, the site 102 is at least partially (and optionally entirely) indoors, but other alternatives are possible.

The system 100A may also be referred to here as a "C-RAN" or a "C-RAN system." The baseband unit 104 is also referred to here as "baseband controller" 104, or just "controller" 104. Each RP 106 may include or be coupled to at least one antenna used to radiate downlink RF signals to user equipment (UEs) 110 and receive uplink RF signals transmitted by UEs 110. The baseband controller 104 may optionally be physically located remotely from the site 102, e.g., in a centralized bank of baseband controllers 104. Additionally, the RPs 106 may be physically separated from each other within the site 102, although they are each communicatively coupled to the baseband controller 104.

Each UE 110 may be a computing device with a processor that executes instructions stored in memory, e.g., a mobile phone, tablet computer, mobile media device, mobile gaming device, laptop computer, vehicle-based computer, a desktop computer, etc. Each baseband controller 104 and RP 106 may be a computing device with at least one processor that executes instructions stored in memory.

The system 100A is coupled to a core network 112 of each wireless network operator over an appropriate back-haul network 116A. For example, the Internet may be used for back-haul between the system 100A and each core network 112. However, it is understood that the back-haul network 116A can be implemented in other ways. Each of the back-haul network 116A and the front-haul network 116B described herein may be implemented with one or more (e.g., up to eight) switches 108A-B, routers, and/or other networking devices. Additionally, the back-haul network 116A and/or the front-haul network 116B may be implemented with a switched ETHERNET network.

The system 100A may be implemented as a Long Term Evolution (LTE) radio access network providing wireless service using an LTE air interface. However, it should be noted that the present systems and methods may be used with other wireless protocols, e.g., 3GPP Fifth Generation technologies. LTE is a standard developed by the 3GPP standards organization. In this configuration, the baseband controller 104 and RPs 106 together are used to implement an LTE Evolved Node B (also referred to here as an "eNodeB" or "eNB"). An eNB may be used to provide UEs 110 with mobile access to the wireless network operator's core network 112 to enable UEs 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNB gateway (HeNB GW) (not shown) and a Security Gateway (SeGW or SecGW) (not shown).

Moreover, in an exemplary LTE configuration, each baseband controller 104 may communicate with the MME and SGW in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and radio point 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In the exemplary configurations shown in FIG. 1, the front-haul network 116B that communicatively couples the baseband controller 104 to the RPs 106 is implemented using two switches 108. However, the front-haul network 116B between the baseband controller 104 and RPs 106 can alternatively be implemented using any number of switches 108A-B, routers, and/or other networking devices. Each RP 106 may be coupled to one of the switches 108 (and next generation RPs may be coupled to more than one switch 108). In some configurations, the switches 108 are daisy-chained, and some of the switches communicates with the baseband controller 104 only through another switch.

In some configurations, in-phase and quadrature (IQ) data representing pre-processed baseband symbols for the air interface is communicated between the baseband controller 104 and the RPs 106. Communicating such baseband IQ data typically requires a relatively high data rate front haul. The connections in and/or for the front-haul network may be implemented using fiber or ETHERNET, where ETHERNET may be a more cost-effective option.

The front-haul data rates between the baseband controller 104 and RPs 106 can grow exponentially as the number of UEs 110 served by the system 100A increases and when features like smart reuse of frequency resources are used. As used herein, smart reuse refers to the same frequency resource(s) being used for a multiple sets of UEs 110, each set of UEs being under a different, geographically diverse set of RPs 106.

For example, in the uplink, the baseband signal can be pre-processed at a source RP 106 and converted to frequency domain signals (after removing guard-band/cyclic-prefix data, etc.) in order to effectively manage the front-haul rates, before being sent to the baseband controller 104. The RP 106 can further reduce the data rates by quantizing such frequency domain signals and reducing the number of bits used to carry such signals and sending the data. In a further simplification, certain symbol data/channel data may be fully processed in the source RP 106 itself and only the resultant information is passed to the baseband controller 104.

The Third Generation Partnership Project (3GPP) has adopted a layered model for the LTE radio access interface. Generally, some combination of the baseband controller 104 and RPs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface. Any suitable split of L1-L3 processing (between the baseband controller 104 and RPs 106) may be implemented. Where baseband signal IQ data is front-hauled between the baseband controller 104 and the RPs 106, each baseband controller 104 can be configured to perform all or some of the digital L1, L2, and L3 processing for the air interface. In this case, the L1 functions in each RP 106 is configured to implement the digital L1 processing for the air interface (not in the baseband controller 104). For example, in this exemplary configuration, each baseband controller 104 may implement a receiver, transmitter, and a scheduler for the cell.

Where the front-haul ETHERNET network 116B is not able to deliver the data rate need to front haul (uncompressed) time-domain IQ data, the time-domain IQ data can be compressed prior to being communicated over the ETHERNET network 116B, thereby reducing the data rate needed communicate such IQ data over the ETHERNET network 116B.

Data can be front-hauled between the baseband controller 104 and RPs 106 in other ways (for example, using front-haul interfaces and techniques specified in the Common Public Radio Interface (CPRI) and/or Open Base Station Architecture Initiative (OBSAI) family of specifications).

Although not shown, a management system may be communicatively coupled to the baseband controller 104 and RPs 106, for example, via the back-haul network 116A and the front-haul network 116B (in the case of the RPs 106). The management system may send and receive management communications to and from the baseband controller 104, each of which in turn forwards relevant management communications to and from the RPs 106.

Load-Testing a C-RAN Using a UE Simulator

In one configuration, load-testing includes setting up an entire C-RAN system 100A (with a baseband controller 104, associated front-haul switches 108, and X remote RPs 106) and attaching several tens of UEs 110 to the system 100A to simulate real-life deployment conditions. In addition, to test the number of UEs 110 performing data-transfers through the system 100A, at least one UE-simulator 114 (e.g., an Aeroflex TM-500, Ercom, etc.) is coupled to at least one RP 106, e.g., via hardwire or wirelessly. The UE simulator 114 may simulate hundreds of UEs 110, e.g., up to 500 or 1000. During load-testing, the RPs 106 communicating with real UEs 110 must be power-controlled accurately, so that there's enough separation between the RPs 106 and they don't cause interference to each other.

However, the testing configuration in FIG. 1 has several downsides: (1) it is expensive to setup and manage; (2) each test requires multiple hours to get baseline measurements, i.e., it takes considerable time to test different combinations of bands, bandwidths, frequency reuse-levels, and different hops of switches 108; (3) as new features are developed and as parameters and/or combination of parameters are to be verified in the system 100A, it takes additional hours of testing to be able to compare with the baseline measurements; (4) the entire system 100A needs to be fine-tuned along with neighboring eNodeBs or RPs 106, so that testing of features like smart frequency reuse and handovers are possible in such load-test environment; and (5) the bandwidths of the individual links (e.g., 100 Mbps or 1 Gbps) between RPs 106 and the switch(es) 108 are typically far less than the bandwidth of the link from the switch(es) 108 to the baseband controller 104, so any load-testing of the front-haul network 116B is limited by the link between the switches 108 and the baseband controller 104.

Furthermore, the same system 100A may also be used for validation of new features like multi-frequency Carrier-Aggregation, multi-operator Next-generation Radio-point modules, higher-layer MIMO combinations (e.g., 4×2 or 4×4), which can exacerbate the cost and complexity of the system 100A.

Therefore, there is a need for a simpler and more efficient testing setup. Accordingly, advantages may be realized by using a scaled-down version of the full-deployment system 100A in FIG. 1 that is still capable of load-testing the front-haul network 116B and presenting a full load to the baseband controller 104. As described below, a simulation testing device may be used in between the front-haul network 116B and the baseband controller 104. The simulation testing device may mimic RP 106 functionality (and optionally UE 110 functionality) while presenting a full load in the front-haul network 116B in order to stress-test the C-RAN system 100.

Aspects of Load Testing

There are several aspects that determine the system sizing and dimensions of a C-RAN system 100. The load on a C-RAN system 100 is controlled by various factors like (1) the number of UEs 110 connected; (2) the number of UE's scheduled per transmission time interval (TTI); (3) the combining factor or number of antennas used (for downlink or uplink signals) (4) the number of hops/switches 108; (5) the serving-bandwidth (and hence sector) packet-rate, e.g., including any smart frequency reuse schemes; (6) the front-haul split used between the baseband controller 104 and the RPs 106; and (7) the number of RPs 106.

Due to the points above, the load on a C-RAN system 100 becomes directly proportional to the front-haul traffic seen by the system 100. The following types of front-haul traffic load on C-RAN systems 100 needs to be considered for successful validation of the system performance: management traffic between the RPs 106 and the baseband controller 104; baseband signal processing traffic between the RPs 106 and the baseband controller 104; traffic generated by having multiple radio modules in next generation RPs 106; and additional traffic resulting from multi-communication techniques, such as Coordinated Multipoint (CoMP) or Joint Transmission (JT). These types of front-haul traffic (e.g., packets) are now described.

First, the management traffic between the RPs 106 and the baseband controller 104 may include traffic from a Hypertext Transfer Protocol Secure (HTTPS) connections between RPs 106 and the baseband controller 104 for exchanging management information. Management traffic may also include secure connections between RPs 106 and the baseband controller 104 for Operational-measurements/log files transfers and/or software upgrade features. Management traffic may also include high packet rate/low latency transactions between RPs 106 and the baseband controller 104 for Precision Time Protocol (PTP) timing synchronization.

Second, baseband signal processing traffic between the RPs 106 and the baseband controller 104 may include control channel signaling between the RPs 106 and the baseband controller 104; shared channel processing traffic between the RPs 106 and the baseband controller 104; and/or additional signal processing traffic between the RPs 106 and the baseband controller 104 for features like Combining or higher order MIMO functions.

As described above, the RPs 106 communicate with the baseband controller 104 via the front-haul network 116B for exchange of baseband signal information. Depending on the L1 split between the RPs 106 and the baseband controller 104, the amount of front-haul traffic can vary vastly from hundreds of Mbps to tens of Gbps. In a C-RAN system 100, multiple RPs 106 may cover the same set of UE(s) 110. Therefore, when the UE's baseband signals are transferred between the RPs 106 and the baseband controller 104, multiple RPs 106 can be configured to transfer them on per UE-basis and per-TTI basis depending on the location of UE 110 with respect to RPs 106. Such functionality is called multi-antennae combining and can be applicable to both uplink and downlink signal processing.

Third, a single next generation RP (nRP), discussed below, may include multiple radio module instances where each radio module instance communicates with its corresponding baseband controller 104. The main radio module instance acts as a host module for providing common services (e.g., timing, image management, IP address management, etc.) for the constituent radio module instance(s). This kind of arrangement multiplies the amount of above-mentioned front-haul traffic types between the RPs 106 and the baseband controller 104. The scaling is proportional to the number of radio module instances hosted on the RP 106.

Fourth, in extended environments like clustered C-RAN systems, multiple baseband controllers 104 may communicate with different RPs 106 for providing functionalities like Coordinated Multipoint (CoMP) and Joint-Transmission (JT) described in the more recent 3GPP standards. They also add significant load on the front-haul and such traffic should be accounted for during testing.

Load-Testing a C-RAN Using a Testing Device

Figure 2:
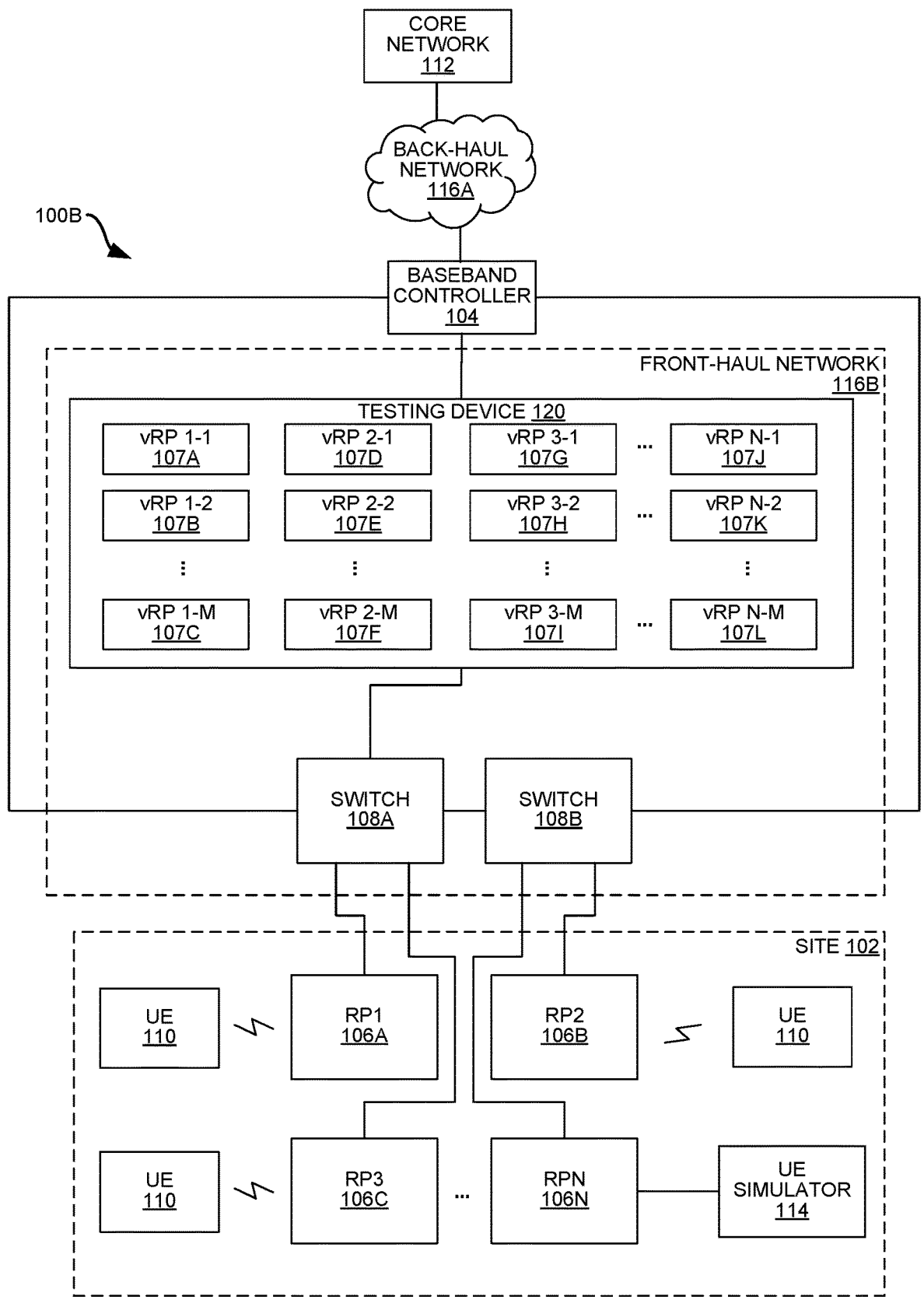
FIG. 2 is a block diagram illustrating an exemplary configuration for load-testing a cloud-radio access network (C-RAN) system using a testing device.

FIG. 2 is a block diagram illustrating an exemplary configuration for load-testing a cloud-radio access network (C-RAN) system 100B using a testing device 120. It is difficult and impractical (in terms of time and cost) to load-test all aspects of the C-RAN system 100 using a single setup (that matches the real customer deployment environment, as described above). However, the C-RAN system 100B illustrated in FIG. 2 may provide maximum coverage of the deployment-type environment and stress the C-RAN 100B "system under test" with the highest possible front-haul traffic rates. Additionally, the C-RAN system 100B in FIG. 2 may be simpler, easier to manage, and more efficient (than the system 100A in FIG. 1) for such load-testing.

The C-RAN system 100B in FIG. 2 is different from the C-RAN system 100A in FIG. 1 in at least two ways. First, the C-RAN system 100B in FIG. 2 includes fewer (N) physical RPs 106 than the number (X) of physical RPs 106 used for the C-RAN system 100A in FIG. 1. For example, where X=32, 64, 96, etc., N=2, 4, 8, etc. In some configurations, N<=8. In some configurations, the C-RAN system 100B may have 3-4 actual RPs 106 connected to the baseband controller 104, and approximately 60 vRPs 107 in the testing device 120, assuming the baseband controller 104 has a capacity of 64 RPs 106. Second, a testing device 120 is introduced in the front-haul network 116B, which is used to generate the types of the front-haul traffic discussed above in order to test the front-haul network 116B. Although a single testing device 120 is illustrated in FIG. 2, more than one may be used in a testing configuration. The testing device 120 may be time-synchronized with the baseband controller 104 and RPs 106, e.g., because it uses the same clock-source, such as GPS or a PTP timing source.

In some configurations, the switches 108 are daisy-chained, and only a single switch 108 is coupled to the testing device 120. Alternatively, more than one switch 108 may be coupled to the testing device 120. Furthermore, the front-haul network 116B may be implemented using any number of switches 108.

The testing device 120 may simulate the maximum number of RP 106 connections (and/or connections of radio module instances in RPs 106) possible towards the baseband controller 104, which performs management actions, log-file transfers, software image upgrades, PTP client functionalities, etc. This may include the testing device 120 performing (1) replicating packet traffic that is sent to and/or received from RPs 106 (and/or radio module instances in RPs 106) in the C-RAN system 100B; (2) limited simulation; and/or (3) full simulation.

In the context of the testing device 120, "replication" refers to the testing device 120 duplicating incoming LTE and/or 5G related traffic (but not non-LTE/5G traffic) with or without changes from the incoming traffic. For example, a replicated packet may appear to come from a real RP 106, even though it is actually created in the testing device 120 based on a packet that is received from the real RP 106. In some configurations, some received packets are replicated with some modification from the original packets, while other received packets are replicated without modification from the original packets. Therefore, unlike limited and full simulation, replication is performed in response to a real packet received at the testing device 120.

In addition to limited simulation, full simulation, and/or replicating packets, the testing device 120 may modify incoming traffic before sending it to the baseband controller 104 or an RP 106. In other words, the testing device 120 may modify incoming packets separate and apart from any replicating. As discussed below, such modifications may include changing the signal strength of a received packet, the RP ID of the received packet, and/or adding a delay before sending the received packet to its destination.

In the context of the testing device 120, "limited simulation" refers to the testing device 120 creating new packets that appear to come from simulated RPs 106. In other words, limited simulation is not performed in response to packet(s) received at the testing device 120, i.e., limited simulation is performed separate and apart from any incoming traffic to the testing device 120. During limited simulation, the testing device 120 may generate non-LTE/non-5G based packets. For example, the testing device 120 may create PTP packets on its own on behalf of up to 64 packets and send to the baseband controller 104. The non-LTE/non-5G based packets may also include file transfers and/or log uploads that increase the load on the baseband controller 104.

During limited simulation, the testing device 120 may additionally (or alternatively) generate LTE and/or 5G related packet traffic at the baseband level (e.g., for channels like RACH, SRS, etc.) in order to cause more load to the C-RAN system 100B. During limited simulation, the simulated traffic (e.g., such as RACH requests and/or SRS indications) may appear (to the receiving device) as coming from real RPs 106 that are not physically connected (simulated RPs, such as the virtual RPs (vRPs) 107A-L). For example, during limited simulation, the LTE and/or 5G packet traffic generated by the testing device 120 may appear to come from RPs 106 RP IDs not currently being scheduled by the baseband controller 104. If such an RP 106 is then subsequently scheduled for UE 110 traffic, the testing device 120 may not generate any response packets for that RP 106.

It should be noted that the testing device 120 does not imitate a UE stack during limited simulation. In other words, the testing device 120 generates RACH and SRS packets that are sent to the baseband controller 104 during limited simulation, but no other (follow-along) types of LTE or 5G related traffic to or from a UE 110, such as various physical data and shared channels. For example, during limited simulation, the testing device 120 does not respond to Random-access-response messages from the baseband controller 104 (after sending the RACH packet to the baseband controller 104).

In the context of the testing device 120, "full simulation" refers to the testing device 120 creating new packets that appear to come from simulated RPs (e.g., vRPs 107A-L), as if generated by simulated UEs 110. In other words, the simulated traffic appears to come from connected RPs 106 that does not physically exist and UEs that physically do not exist. The simulated traffic may be injected into the fronthaul network 116B and sent to the baseband controller 104. The full simulation is not performed in response to packet(s) received at the testing device 120, i.e., full simulation is performed separate and apart from any incoming traffic to the testing device 120. Similar to limited simulation, full simulation may include the testing device 120 generating (1) non-LTE/non-5G based packets, e.g., PTP, file transfers and/or log uploads; and/or (2) LTE and/or 5G packet traffic.

However, unlike limited simulation, the testing device 120 may generate LTE and/or 5G related packets beyond RACH and SRS indications during full simulation. For example, assume that RPs 106 with RP IDs 1-44 are actively being scheduled with UE traffic by the baseband controller and RPs 106 with RP IDs 45-64 are not physically connected to (and not being scheduled by) the baseband controller 104. In this example, if the testing device 120 sends a RACH indication on behalf of UE-x with RP ID 45-64 (where RP IDs 45-48 have the highest SINR values), the baseband controller 104 will then respond with a Random-access-response for UE-x on RP-id 45-48 (the baseband controller 104 chooses those RPs 106 only based on SINR). Unlike limited simulation, the testing device 120 may then trap this message, read it, and send back a "PUSCH-IQ" msg-3 (as if generated by UE-x/RP-id 45-48) and a unique Contention-resolution-identity. This response from the testing device 120 may be similar to the functions of the UE stack, e.g., where the UE 110 generates an RRC message that goes to its L2 function, then encodes the message into a baseband signal that is sent over via RF signal that is received and pre-processed by the RP 106 into PUSCH-IQ message. In other words, full simulation may include at least partial imitation of a UE stack.

The baseband controller 104 may then decode this IQ from the testing device 120 and generate a Physical channel HybridARQ Indicator Channel (PHICH) Ack, after which a higher layer (in the testing device 120) will generate a contention-resolution message (unique contention-resolution-identity). The testing device 120 may again trap a Contention resolution message from the baseband controller 104 and send a HARQ-ack back on behalf of UE-x/RP-id 45-58. The baseband controller 104 CU will thereafter send the next RRC message (for UE-x/RP-45-58), which the testing device 120 will trap and send an RRC-complete response message on behalf of UE-x/RP IDs 45-58. Subsequently, the testing device 120 may continue to send CQI and/or SRS messages periodically on behalf of UE-x/RP IDs 45-58. Therefore, full simulation may simulate the multiple protocols' stack functions of the RP 106 and UE 110 together.

In the example configuration of FIG. 2, each of the N RPs 106 in the C-RAN system 100B may have M corresponding vRPs 107 configured in the testing device 120. In some configurations, a particular vRP 107 may be associated with a particular RP 106.

For example, vRP 1-1 107A through vRP 1-M 107C may perform (1) replication (with or without modification) of packets received from RP1 106A via the first switch 108A; (2) modify packets received from RP1 106A via the first switch 108A before sending to the baseband controller 104; (3) limited simulation; and/or (4) full simulation.

Similarly, vRP 2-1 107D through vRP 2-M 107F may perform (1) replication (with or without modification) of packets received from RP2 106B via the second switch 108B; (2) modify packets received from RP2 106B via the second switch 108B before sending to the baseband controller 104; (3) limited simulation; and/or (4) full simulation.

Similarly, vRP 3-1 107G through vRP 3-M 107I may perform (1) replication (with or without modification) of packets received from RP3 106C via the first switch 108A; (2) modify packets received from RP3 106C via the first switch 108A before sending to the baseband controller 104; (3) limited simulation; and/or (4) full simulation.

Similarly, vRP N-1 107I through vRP N-M 107L may perform (1) replication (with or without modification) of packets received from RP4 106D via the second switch 108B; and/or (2) modify packets received from RP4 106D via the second switch 108B before sending to the baseband controller 104; (3) limited simulation; and/or (4) full simulation.

In some configurations, different RPs 106 are not necessarily associated with the same number of vRPs 107. For example, in some configurations, RP1 may be associated with 4 vRPs 107 while RP2 is associated with 3 vRPs 107, etc.

Each vRP 107 may be implemented using at least one processor executing instructions that are stored in at least one memory and executable to replicate packets and/or other vRP 107 functions described herein. In some configurations, more than one (e.g., all) vRP 107 may be implemented on the same processor or processor core.

As described above, the testing device 120 may optionally modify certain packets, received from RPs 106 (or the baseband controller 104), during replication. In other words, replicating may include duplicating with or without changes from the original packet. Furthermore, the testing device 120 may optionally modify certain incoming packets without duplicating them. For example, the testing device 120 may modify (as part of, or different from, replication): (1) the simulated number of hops/switches 108 the packets (replicated and/or modified) traversed to arrive at the testing device 120, e.g., by adding an adjustable delay before sending the packets to the baseband controller 104; (2) the simulated received signal strength of the packets (replicated and/or modified); and/or (3) the simulated RP ID of the RP 106 receiving the packet from a UE 110. The modification(s) may also run the vRP 107 packets through different hardware or software queues in the testing device 120 to simulate network traffic delays/congestion. Other aspects of received and/or replicated packets may also be modified compared to their respective original packets. In some configurations, selective packets are not replicated at all in order to simulate error conditions, such as packet-drops.

The vRP 107 packets appear to the baseband controller 104 as coming from connected RPs 106 (not vRPs 107), either RPs 106 that are actually connected or simulated RPs 106 that only appear to the baseband controller 104 as being actually connected to the C-RAN system 100B. So, from the baseband controller's perspective, it receives packets from more than just the N connected RPs 106. For example, the baseband controller 104 sees packets from up to (N+N*M) RPs 106. In this way, the testing device(s) 120 may enable up to a full load to be presented to the baseband controller 104 without a full deployment of RPs 106.

The testing device 120 may send simulated/replicated/modified packets from the vRPs 107 to the baseband controller 104. Additionally, original packets from the RPs 106 may be sent to the baseband controller 104 (e.g., with optional intervening routers, switches 108, and/or other networking devices) from the switches 108 in addition to being sent to the testing device 120 for replication.

In some configurations, only one of the switches 108A is coupled (e.g., through optional intervening routers, switches 108, and/or other networking devices) to the testing device 120, while in other configurations multiple (or all) switches 108 are coupled to the testing device 120. For example, the packets from RP2 106B may be sent to the testing device 120 via the second switch 108B, then the first switch 106A.

The testing device 120 may be designed, developed and/or provisioned in the C-RAN system 100B for load-testing. The testing device 120 may be implemented on high-performance/low-latency platform to be able to scale for the needs of the load-testing. The testing device 120 may also be efficient, so that it doesn't introduce any unintentional large delays and/or drops in the end-to-end C-RAN system 100B.

The testing device(s) 120 may be deployed in different variations of the system 100B (e.g., different number of switches 108, RPs 106, UEs 110, and/or baseband controllers 104) before testing on the full-deployment C-RAN system 100A (which tries to closely mimic the real deployment configuration). Using the testing device(s) 120 may result in efficiency and cost-savings because it reduces the number of RPs 106 compared to a full deployment (e.g., from RP(X=n*4) to RP(N=n)), thereby reducing the associated equipment like corresponding UEs 110, switches 108, connections, etc.

Figure 3:
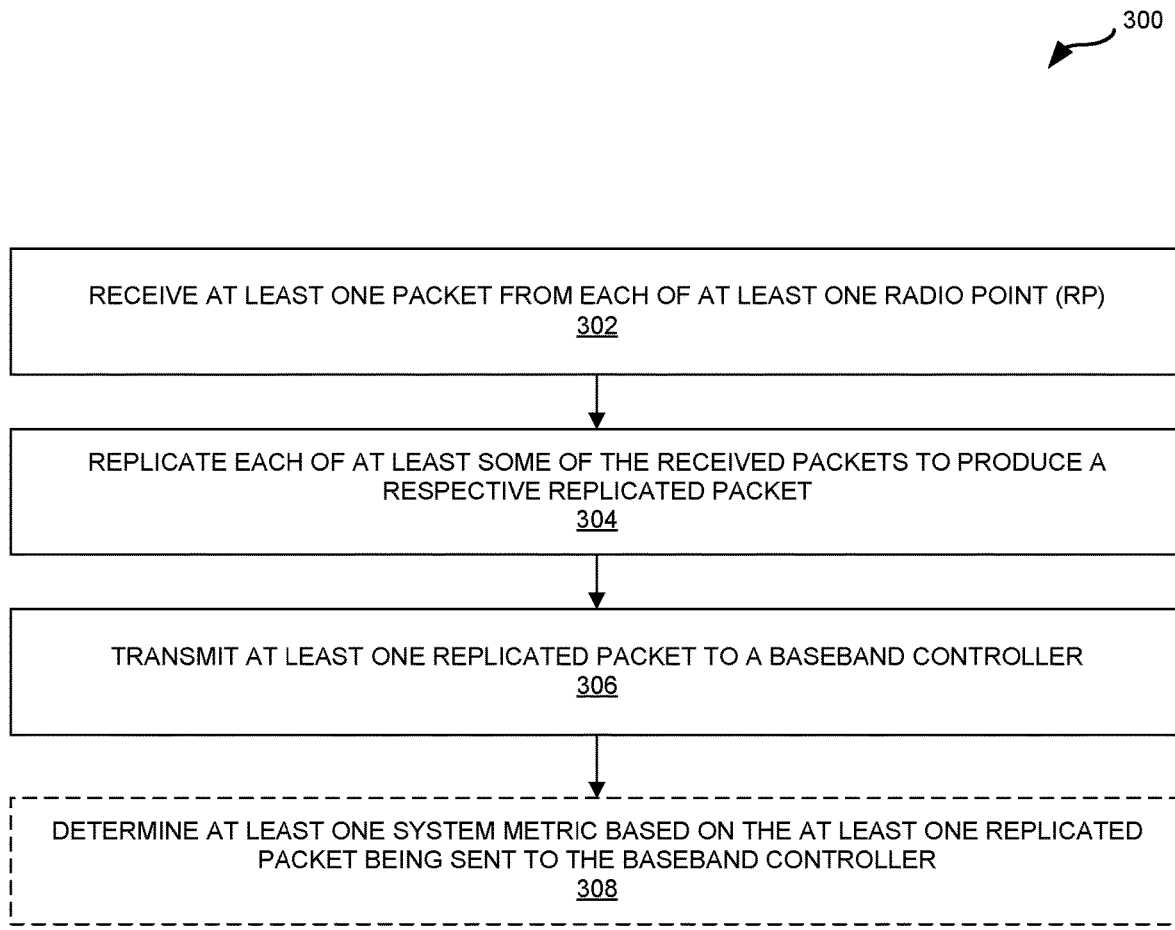
FIG. 3 is a flow diagram illustrating an example method for load-testing a C-RAN system.

FIG. 3 is a flow diagram illustrating an example method 300 for load-testing a C-RAN system 100B. The method 300 may be implemented in a C-RAN system 100B configured with at least one RP 106, at least one baseband controller 104, and a front-haul network 116B (with at least one switch 108 and at least one testing device 120). Specifically, the method 300 may be implemented, at least partially, by a testing device 120 that implements at least one vRP 107 for each of the RPs 106 in the C-RAN system 100B. The testing device 120 may be implemented with at least one processor executing instructions that are stored in at least one memory.

The method 300 may begin at step 302 where the testing device 120 receives at least one packet from each of at least one RP 106. The RP(s) 106 may determine the packet(s) from RF signals received from UE(s) 110 (and optionally a UE simulator 114), after which the packet(s) are sent to the testing device 120. For example, each RP 106 may be coupled to the testing device 120 via one or more switches 108. In some configurations, the switches 108 are daisy-chained, and only a single switch 108 is coupled to the testing device 120. Alternatively, more than one switch 108 may be coupled to the testing device 120. The at least one packet from the at least one RP 106 may also be sent to the baseband controller 104 (in addition to the testing device 120).

The method 300 may proceed at step 304 where the testing device 120 (e.g., respective vRPs 107) replicates each of at least some of the received packets to produce a respective replicated packet. In some configurations, each received packet may be replicated M times. Alternatively, packets from a particular RP 106 may be replicated a different number of times than packets from a different RP 106. In some configurations, certain packets may not be replicated at all in order to simulate packets being dropped.

As described above, in some configurations, replicating may include duplicating the received packet with some changes. For example, the following aspects of received packets may be modified: (1) the simulated number of hops/switches 108 the replicated packets traversed to arrive at the testing device 120, e.g., by using an adjustable delay when sending the packets to the baseband controller 104; (2) the simulated received signal strength of the replicated packets; and/or (3) the simulated RP ID of the RP 106 receiving the packet from a UE 110. Additionally or alternatively, other aspects of the replicated packets may be modified compared to their respective original packets.

The method may proceed at step 306 where the testing device 120 transmits at least one replicated packet to the baseband controller 104. The replicated packets appear to the baseband controller 104 as coming from connected RPs 106 (not vRPs 107), either RPs 106 that are actually connected or simulated RPs 106 that only appear to the baseband controller 104 as being actually connected. In some configurations, the RP(s) 106 also send the original packet(s) to the baseband controller 104 (in addition to the testing device 120).

In some configurations, the combination of replicated packets (from the testing device 120) and original packets (from RPs 106) may represent a full load to the baseband controller 104. So, from the baseband controller's perspective, it receives packets from more than just the N connected RPs 106. For example, the baseband controller 104 sees packets from up to (N+N*M) RPs 106.

The method may proceed at optional step 308 where at least one system metric is determined based on the at least one replicated packet being sent to the baseband controller 104. Without limitation, the following types of metrics may be monitored while the system 100 is operating under the simulated full-load condition: baseband controller 104 front-haul reception performance; system 100 block error rate (BLER); packet latencies (uplink and/or downlink); and/or RP 106 timing. In some configurations, the baseband controller 104 front-haul reception performance may be quantified as the ratio of (1) the number of packets processed (by the baseband controller 104) per second; to (2) the number of packets dropped per second plus the number of packets processed (by the baseband controller 104) per second.

Advantages of Load-Testing Using a Testing Device

The present systems and methods have several advantages over other C-RAN 100 load testing solutions. First, by simulating vRPs 107 and by performing limited simulation, full simulation, replication, and/or modification of packets (e.g., adding delays, packet drops, and/or other packet manipulations): (1) real deployment considerations can be studied; (2) the effect on the C-RAN system 100 can be studied; and/or (3) the necessary functions can be enhanced to make an actual C-RAN deployment more robust. For example, the system 100 may test the addition of switch(es) 108 without adding real switch(es) 108.

Second, the testing device 120 is useful for one-sector C-RAN system 100 testing. However for multi-sector systems (e.g., having multiple radio module clusters and/or multiple baseband controller 104 clusters), a number of additional testing devices 120 may also be added (to minimize the latency in the system 100). In other words, the testing device 120 may be scaled for multi-sector C-RAN systems 100.

Third, the testing device 120 can be adapted for the latest 3GPP standards developed for Narrow Band-IOT and for systems based on Citizens Broadband Radio Service (CBRS) alliance standards.

Fourth, the testing device 120 can be adapted to work with other types of interfaces being developed for 3GPP 5G New Radio (NR) system standards and OpenRAN projects like the Femto Application Platform Interface (FAPI) or Enhanced Common Public Radio Interface (eCPRI) interfaces (along with their radio module instance simulation). This makes it possible to use the testing device 120 for verifying components of RAN/eNodeB system-components, even if they use different types of splits, e.g., proposed in the latest 3GPP releases.

Fifth, the testing device(s) 120 can also optionally be adapted to simulate real UEs 110 (along with the vRPs 107) and interface natively to the C-RAN system 100 components. This makes it possible to develop and interface with UE simulators 114, which are C-RAN-aware, and utilize them for efficient testing and verification of C-RAN systems 100.

Load-Testing a C-RAN Using vRPs in an RP

Other solutions for load-testing a C-RAN system 100 may include emulating vRPs 107 inside of connected RPs 106. This has at least two shortcomings: (1) emulating the vRPs 107 may impact the performance of the RP 106 itself, e.g., by consuming resources in the RP 106; and/or (2) the link between each RP 106 and the switch 108 has a limit (e.g., 1 Gbps, 2.5 Gbps, etc.), so it is difficult to simulate multiple RPs 106 (e.g., N×1 Gbps) in the link. This is the same bandwidth shortcoming that applies to the testing configuration in FIG. 1 (using the UE simulator 114 coupled to one of the RPs 106).

In contrast, the testing device 120 places no design changes on the existing hardware or software components of the baseband controller 104, RPs 106, and/or radio modules in RPs 106. In that way, the system under test is not loaded or influenced by the testing device 120. Therefore, a testing device 120 may be used as a different, external, high-performance, and scalable device (or devices) to verify C-RAN systems 100 under test. In other words, the testing device 120 may act as a black-box of sorts, with minimal influence on the existing packet-flows in the C-RAN system 100.

Additionally, the combination of packets from the testing device 120 is able to present a full load to the baseband controller 104. This full load can stress-test the ability of the baseband controller 104 to receive and process the packets in a simulated deployment.

5G New Radio Split Architecture and Interfaces

Figure 4:
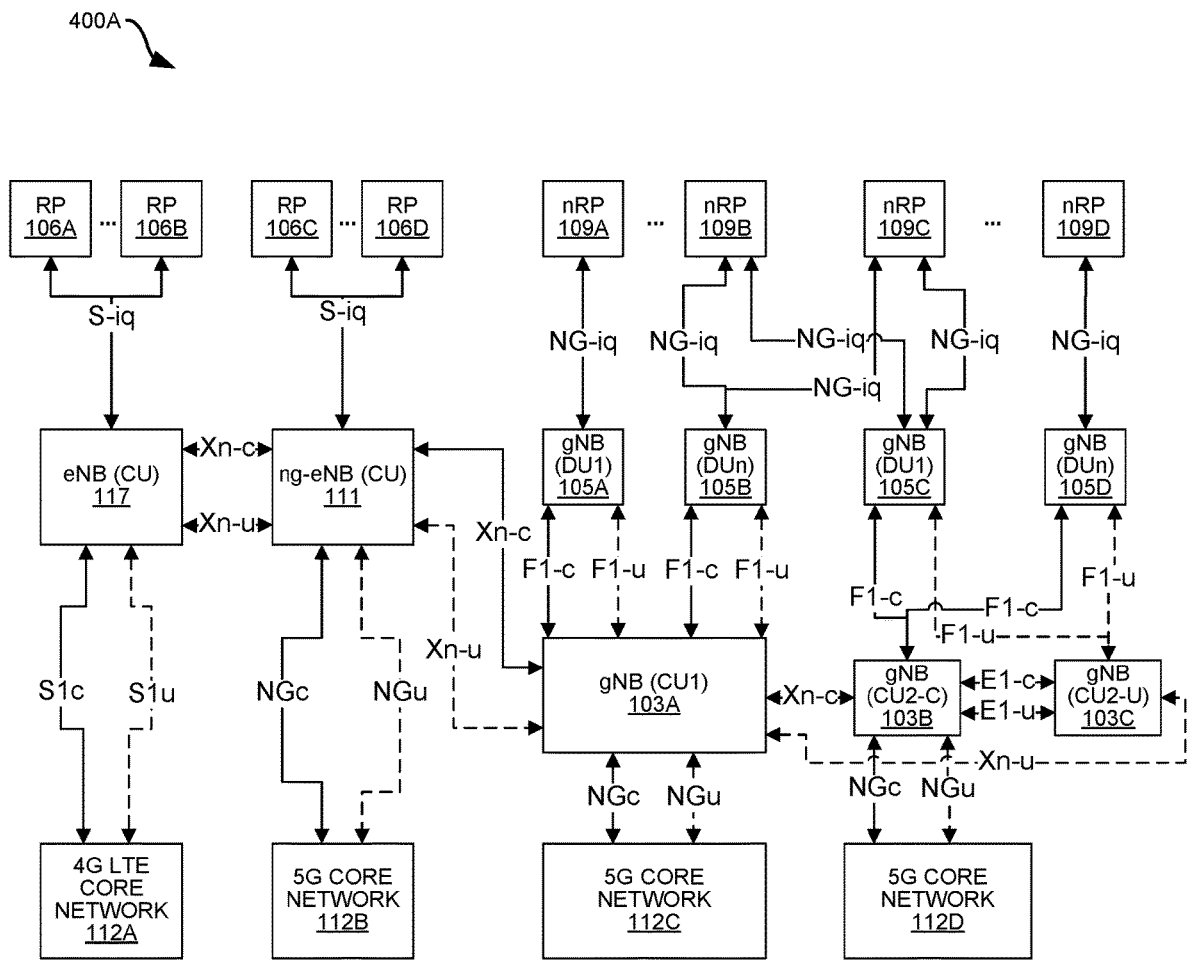
FIG. 4 is a block diagram illustrating an exemplary configuration of a system that includes 3GPP Fourth Generation (4G) and Fifth Generation (5G) components.

FIG. 4 is a block diagram illustrating an exemplary configuration of a system 400A that includes 3GPP Fourth Generation (4G) and Fifth Generation (5G) components. Alternatively, the system 400A may include only 4G or only 5G components. Each of the components may be implemented using at least one processor executing instructions stored in at least one memory. In some configurations, at least some of the components are implemented using a virtual machine. As will be discussed below, the system may be load-tested using one or more testing devices 120.

Fifth Generation (5G) standards (promulgated by 3GPP) are being developed to support a wide variety of applications, bandwidth, and latencies while supporting various implementation options. In the system 400A, interfaces denoted with "-C" (illustrated with solid lines) provide control plane connectivity, while interfaces denoted with ("-U") (illustrated with dashed lines) provide user plane connectivity. More explanation of the various devices and interfaces in FIG. 4 can be found in 3GPP TR 38.801 Radio Access Architecture and Interfaces, Release 14 (available at https://portal.3gpp.org/desktopmodules/Specifications/ SpecificationDetails.aspx? specific ationId=3056), which is incorporated by reference herein. FIG. 4 illustrates three different types of access networks: an eNodeB (eNB) on the left, an LTE Next Generation eNodeB (ng-eNB), and two different examples of a 5G Next Generation NodeB (gNB controller) on the right.

The LTE eNB may include a Central Unit (CU) (e.g., that is implemented in a baseband controller 104) and a set of RPs 106A-B. An LTE S1 interface (including the S1c part (control plane) and S1u part (user plane)) is used between CU 117 and at least one wireless service provider's LTE core network 112A. As described above, the RPs 106A-B may communicate IQ data to the CU 117 using the LTE S-iq interface.

In the example in FIG. 4, the ng-eNB may include a Central Unit (CU) 111 and a set of RPs 106C-D. The CU 111 communicate with at least one wireless service provider's Next Generation Cores (NGC) 112B using the 5G NGc and 5G NGu interfaces. The RPs 106C-D in the ng-eNB may also communicate IQ data to the CU 111, e.g., using the LTE S-iq interface. The ng-eNB may provide LTE and/or 5G service to UEs 110.

The architecture of a Next Generation NodeB (gNB controller) is partitioned into a 5G Central Unit (CU) 103A-C and a 5G Distributed Unit (DU) 105A-D. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-D over a front-haul interface (including F1-c and F1-u for the control plane and user plane, respectively). The 5G CU 103 may communicate with at least one wireless service provider's Next Generation Cores (NGC) 112C-D using 5G NGc and 5G NGu interfaces.

The Distributed Units (DUs) 105 may be nodes that implement a subset of the gNB controller functions, depending on the functional split (between CU 103 and DU 105). In some configurations, the L3 functionality may be implemented in the CU 103 and the L2 operations may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) can further offload some of its PHY functions to RPs 106.

In some configurations, a 5G CU is split between a CU-C 103B that handles control plane functions and a CU-U 103C that handles user plane functions. In a split configuration, the CU-C 103B may communicate with the CU-U 103C using 5G E1-c and 5G E1-u interfaces, respectively.

In one configuration, the Next generation RPs (nRPs) 109A-D may communicate baseband signal data to the DUs 105 on an NG-iq interface. In some configurations, the nRPs 109 may implement at least some of the Layer-1 and/or Layer-2 functions. In some configurations, the nRPs 109 may have multiple ETHERNET ports and can communicate with multiple switches 108.

Any of the interfaces in FIG. 4 may be implemented using a switched ETHERNET (or fiber) network. Additionally, the various CUs in FIG. 4 may communicate with each other using an Xn-c and Xn-u interface. A front-haul interface (not shown in FIG. 4) may facilitate the S-iq and/or NG-iq interfaces.

As seen in FIG. 4, the system 400A includes many interfaces between its nodes, along with the co-existence of 4G and 5G systems. In order to verify the example system 400A with high data-rates, a large number of UEs 110, and complexity, at least one testing device 120 can be enhanced and used.

Load-Testing a 5G C-RAN System

Figure 5:
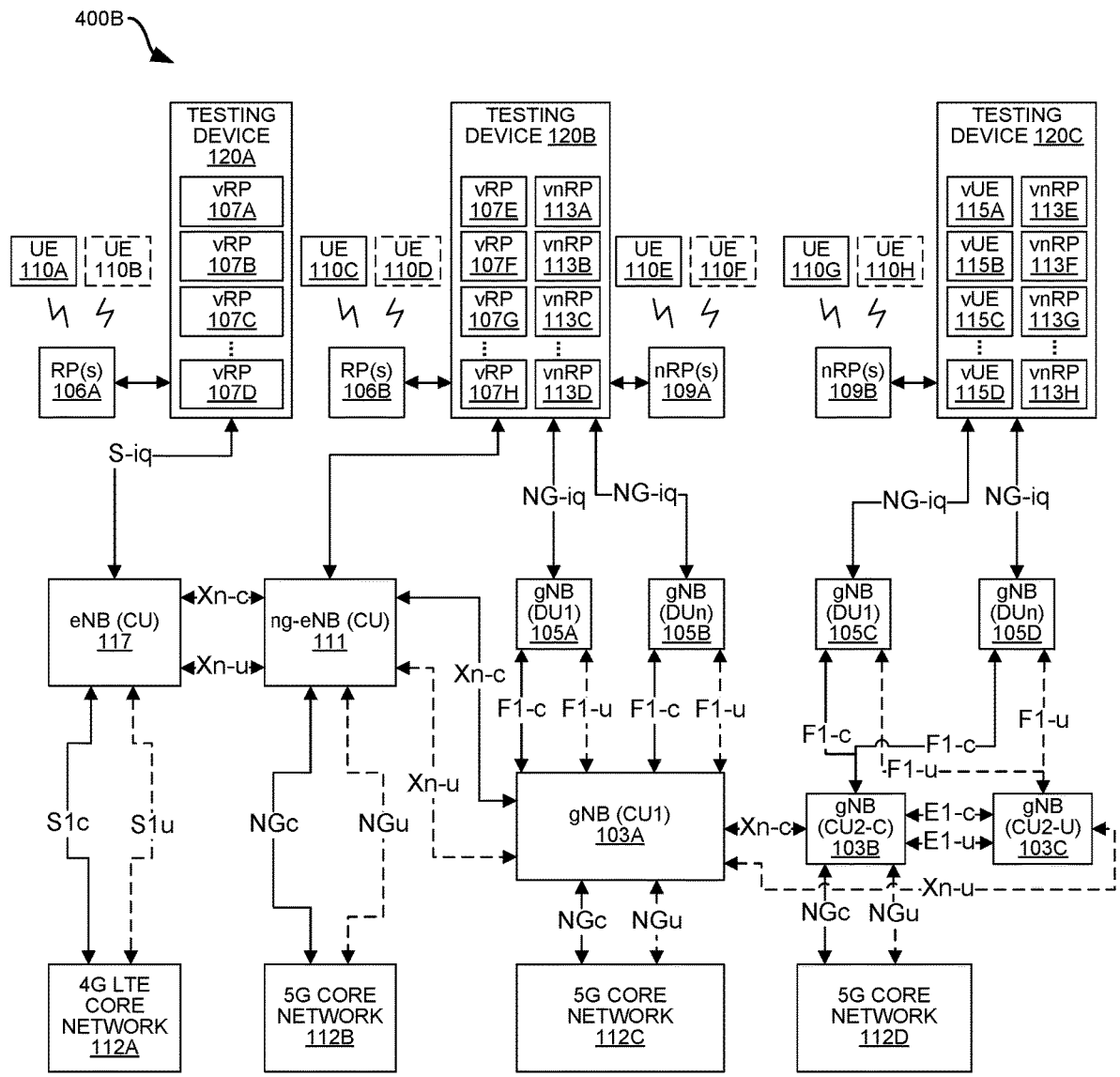
FIG. 5 is a block diagram illustrating an exemplary configuration for load-testing a system using at least one testing device.

FIG. 5 is a block diagram illustrating an exemplary configuration for load-testing a system 400B using at least one testing device 120A-C. The system 400B may include an example LTE eNB, an example ng-eNB, and two different example 5G gNB controllers, as described above. The LTE eNB may be load-tested using a first testing device 120A and one or more UEs 110A-B communicating with one or more RPs 106A. The ng-eNB may be load-tested using a second testing device 120B and one or more UEs 110C-D communicating with one or more RPs 106B. The second testing device 120B may also load-test the first 5G gNB controller, along with one or more UEs 110E-F and one or more nRPs 109A. The second 5G gNB controller may be load-tested using a third testing device 120C and one or more UEs 110G-H communicating with one or more nRPs 109B. The system 400B may alternatively include only 4G or only 5G components.

The first testing device 120A connected to the eNodeB (eNB) may include a number of vRPs 107A-D, as described above. Similar to the system 100B in FIG. 2, the RP(s) 106A may send packets to the eNB CU 117 (e.g., implementing the baseband controller 104 illustrated in FIG. 1 or 2) via the testing device 120A (e.g., that is in the front-haul switched ETHERNET network, not shown in FIG. 5). The testing device 120A may perform limited simulation, full simulation, replication, and/or other modification of at least some of the packets from the RP(s) 106A before sending to the CU 117, as described above. The modifications (as part of replication or otherwise) may include adding a delay when sending the packets to the CU 117; changing the simulated received signal strength of replicated packets; and/or changing the simulated RP ID of the RP(s) 106A receiving the packet from a UE 110A-B. Additionally or alternatively, certain packets may not be replicated at all in order to simulate packets being dropped. In some configurations, the combination of replicated packets (from the testing device 120A) and original packets (from RP(s) 106A) may represent a full load to the CU 117, thereby enabling load-testing of the eNB without a full deployment of RPs 106 and UEs 110.

The second testing device 120B may be connected to the Next Generation eNodeB (ng-eNB) and a 5G Next Generation NodeB (gNB controller). This testing device 120B may include a number of vRPs 107E-H (communicating with the ng-eNB CU 111 on the S-iq interface) as well as a number of virtual next generation RPs (vnRPs) 113A-D (communicating with a 5G gNB DU 105A on the NG-iq interface). The vRPs 107E-H may perform limited simulation, full simulation, replication, and/or other modification of packets from the RP(s) 106B, while the vnRPs 113 may replicate packets from the nRP(s) 109A. In some configurations, the ng-eNB CU 111, and/or the 5G CU 103A may be implemented in at least one baseband controller 104 or in a virtual machine in a cloud computing environment. In some configurations, the 5G DUs 105A-B may be, at least partially, implemented in nRPs 109 and/or one or more baseband controllers 104 of FIG. 1 or 2. In some gNB controller configurations, the DU 105 may be implemented in a baseband controller 104, the CU may be implemented in a separate computing device, and the testing device 120 is implemented in the front-haul network (not shown in FIG. 5) between the RPs 106 (or nRPs 109) and the DUs 105.

In some configurations, the second testing device 120B may be part of a switched ETHERNET front-haul network (not shown in FIG. 5). The RP(s) 106B may send packets to the ng-eNB CU 111 via the testing device 120B, which simulates the vRPs 107E-H, sending simulated packets to the ng-eNB CU 111. In some configurations, some combination of simulated and replicated packets (from the testing device 120B), along with the original packets (from RP(s) 106B), may represent a full load to the ng-eNB CU 111, thereby enabling load-testing of the ng-eNB without a full deployment of RPs 106 and UEs 110.

Similarly, the nRP(s) 109A may send packets to at least one 5G DU 105 via the testing device 120B, which simulates the vnRPs 113A-D and sends the simulated packets to the 5G DU 105A. In some configurations, some combination of simulated and replicated packets (from the testing device 120B), along with the original packets (from nRP(s) 109), may represent a full load to the 5G DUs 105A-B and CU 103A, thereby enabling load-testing of the 5G gNB controller without a full deployment of nRPs 109 and UEs 110.

The third testing device 120C may be connected to the 5G Next Generation NodeB (gNB controller), but not the LTE next generation eNodeB (ng-eNB). This testing device 120C may include a number of vnRPs 113E-H as well as a number of virtual UEs (vUEs) 115A-D (both communicating with a 5G gNB DU 105D on the NG-iq interface). In some configurations, the 5G CU portions 103B-C may be implemented in a baseband controller 104. In some configurations, the 5G DUs 105C-D may be implemented in nRPs 109. In some configurations, the third testing device 120C may be part of a switched ETHERNET front-haul network (not shown in FIG. 5).

In some configurations, the nRP(s) 109B may send packets to at least one 5G DU 105 via the testing device 120C, which simulates the vnRPs 113E-H and sends the simulated packets to the 5G DU 105D. Optionally, the vUEs 115A-D in the testing device 120C may send additional packets from simulated UEs 110, which are processed and forwarded by vnRP 113E-H to the 5G DU 105D. In some configurations, some combination of simulated and replicated packets (from the testing device 120C), along with the original packets (from nRP(s) 109) may represent a full load to the 5G DUs 105C-D and CU 103B-C, thereby enabling load-testing of the 5G gNB controller without a full deployment of nRPs 109 and UEs 110.

Any of the vRPs 107, vnRPs 113, and/or vUEs 115 may be implemented by at least one processor executing instructions stored in at least one memory. Any number of UEs 110 may be connected to a particular RP 106 or nRP 109 during load-testing.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for load-testing a C-RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a system for load-testing a cloud radio access network (C-RAN), comprising: at least one radio point (RP), each being configured to exchange radio frequency (RF) signals with at least one user equipment (UE); a baseband controller communicatively coupled to the at least one RP via a front-haul ETHERNET network; the front-haul ETHERNET network, comprising: at least one switch; and a testing device that is time-synchronized to the baseband controller and the at least one RP, the testing device being configured to: receive at least one packet from each of the at least one RP; replicate each of at least some of the received packets to produce a respective replicated packet; and transmit at least one replicated packet to the baseband controller.

Example 2 includes the system of Example 1, wherein the at least one switch comprises a plurality of switches, each being configured to communicate with the baseband controller.

Example 3 includes the system of Example 2, wherein the at least one RP comprises a plurality of RPs, wherein a first RP send packets to the baseband controller via a first switch and not a second switch, wherein a second RP sends packets to the baseband controller via the first switch and the second switch.

Example 4 includes the system of Example 3, wherein the first RP has a single ETHERNET port that is used to communicate with the first switch, wherein the second RP is a next generation RP (nRP), wherein the second RP has a first ETHERNET port that is used to communicate with the first switch and a second ETHERNET port that is used to communicate with the second switch.

Example 5 includes the system of any of Examples 1-4, wherein the testing device is configured to replicate a particular received packet by duplicating and modifying the particular received packet to produce a particular replicated packet.

Example 6 includes the system of Example 5, wherein the modifying comprises adding a delay before sending the particular replicated packet to the baseband controller.

Example 7 includes the system of any of Examples 5-6, wherein the modifying comprises changing a simulated received signal strength of the particular replicated packet.

Example 8 includes the system of any of Examples 5-7, wherein the modifying comprises changing a simulated RP identification of a simulated RP that received the particular received packet from a UE.

Example 9 includes the system of any of Examples 1-8, wherein one or more of the received packets are not replicated.

Example 10 includes the system of any of Examples 1-9, wherein one or more of the replicated packets are not sent the baseband controller.

Example 11 includes the system of any of Examples 1-10, wherein the testing device is configured to replicate one or more received packets by duplicating the one or more received packets without modification to produce respective one or more replicated packets.

Example 12 includes the system of any of Examples 1-11, wherein each of the at least one replicated packet appears, to the baseband controller, as coming from one of the at least one RP.

Example 13 includes the system of any of Examples 1-12, wherein the testing device is further configured to perform limited simulation, comprising: generating at least one Random Access Channel (RACH) request packet, at least one Sounding Reference Signal (SRS) indication packet, or both; and sending the at least one RACH request packet, at least one SRS indication packet, or both to the baseband controller.

Example 14 includes the system of Example 13, wherein the limited simulation further comprises: generating at least one Precision Time Protocol (PTP) packet that is not related to Third Generation Partnership Project (3GPP) Long Term Evolution (LTE) or Fifth Generation (5G) standards; and sending the at least one PTP packet to the baseband controller.

Example 15 includes the system of any of Examples 1-14, wherein the testing device is further configured to perform full simulation, comprising: generating at least one Random Access Channel (RACH) request packet, at least one Sounding Reference Signal (SRS) indication packet, or both; and sending the at least one RACH request packet, at least one SRS indication packet, or both to the baseband controller.

Example 16 includes the system of Example 15, wherein the full simulation further comprises: receiving at least one response packet, from the baseband controller, that was generated in response to the at least one RACH request packet; generating at least one additional packet in response to the response packet; and sending the at least one additional packet to the baseband controller.

Example 17 includes the system of Example 16, wherein the at least one response packet is a Radio Resource Control (RRC) random access response packet.

Example 18 includes the system of any of Examples 16-17, wherein the at least one additional packet is a Physical Uplink Shared Channel in-phase and quadrature (PUSCH-IQ) message; and wherein the testing device is further configured to process additional protocol messages from the baseband controller and exchange additional protocol response messages, on behalf of a simulated UE and a simulated RP, with the baseband controller.

Example 19 includes the system of any of Examples 15-18, wherein the full simulation further comprises: generating at least one Precision Time Protocol (PTP) packet that is not related to Third Generation Partnership Project (3GPP) Long Term Evolution (LTE) or Fifth Generation (5G) standards; and sending the at least one PTP packet to the baseband controller.

Example 20 includes a method for load-testing a cloud radio access network (C-RAN) system, the method comprising: receiving at least one packet from each of at least one radio point (RP), wherein the testing device is communicatively coupled to the at least one RP via at least one switch in a front-haul network; replicating each of at least some of the received packets to produce a respective replicated packet; and transmitting at least one replicated packet to a baseband controller.

Example 21 includes the method of Example 20, wherein the at least one switch comprises a plurality of switches, each being configured to communicate with the baseband controller.

Example 22 includes the method of Example 21, wherein the at least one RP comprises a plurality of RPs, wherein a first RP send packets to the baseband controller via a first switch and not a second switch, wherein a second RP sends packets to the baseband controller via the first switch and the second switch.

Example 23 includes the method of Example 22, wherein the first RP has a single ETHERNET port that is used to communicate with the first switch, wherein the second RP is a next generation RP (nRP), wherein the second RP has a first ETHERNET port that is used to communicate with the first switch and a second ETHERNET port that is used to communicate with the second switch.

Example 24 includes the method of any of Examples 20-23, wherein replicating a particular received packet comprises duplicating and modifying the particular received packet to produce a particular replicated packet.

Example 25 includes the method of Example 24, wherein the modifying comprises adding a delay before sending the particular replicated packet to the baseband controller.

Example 26 includes the method of any of Examples 24-25, wherein the modifying comprises changing a simulated received signal strength of the particular replicated packet.

Example 27 includes the method of any of Examples 24-26, wherein the modifying comprises changing a simulated RP identification of a simulated RP that received the particular received packet from a UE.

Example 28 includes the method of any of Examples 20-27, wherein one or more of the received packets are not replicated.

Example 29 includes the method of any of Examples 20-28, wherein one or more of the replicated packets are not sent the baseband controller.

Example 30 includes the method of any of Examples 20-29, wherein the replicating comprises duplicating one or more received packets without modification to produce respective one or more replicated packets.

Example 31 includes the method of any of Examples 20-30, wherein each of the at least one replicated packet appears, to the baseband controller, as coming from one of the at least one RP.

Example 32 includes the method of any of Examples 20-31, further comprising performing limited simulation, comprising: generating at least one Random Access Channel (RACH) request packet, at least one Sounding Reference Signal (SRS) indication packet, or both; and sending the at least one RACH request packet, at least one SRS indication packet, or both to the baseband controller.

Example 33 includes the method of Example 32, wherein the limited simulation further comprises: generating at least one Precision Time Protocol (PTP) packet that is not related to Third Generation Partnership Project (3GPP) Long Term Evolution (LTE) or Fifth Generation (5G) standards; and sending the at least one PTP packet to the baseband controller.

Example 34 includes the method of any of Examples 20-33, further comprising performing full simulation, comprising: generating at least one Random Access Channel (RACH) request packet, at least one Sounding Reference Signal (SRS) indication packet, or both; and sending the at least one RACH request packet, at least one SRS indication packet, or both to the baseband controller.

Example 35 includes the method of Example 34, wherein the full simulation further comprises: receiving at least one response packet, from the baseband controller, that was generated in response to the at least one RACH request packet; generating at least one additional packet in response to the response packet; and sending the at least one additional packet to the baseband controller.

Example 36 includes the method of Example 35, wherein the at least one response packet is a Radio Resource Control (RRC) random access response packet.

Example 37 includes the method of any of Examples 35-36, wherein the at least one additional packet is a Physical Uplink Shared Channel in-phase and quadrature (PUSCH-IQ) message; and further comprising processing additional protocol messages from the baseband controller and exchanging additional protocol response messages, on behalf of a simulated UE and a simulated RP, with the baseband controller.

Example 38 includes the method of any of Examples 34-37, wherein the full simulation further comprises: generating at least one Precision Time Protocol (PTP) packet that is not related to Third Generation Partnership Project (3GPP) Long Term Evolution (LTE) or Fifth Generation (5G) standards; and sending the at least one PTP packet to the baseband controller.

The invention claimed is:

1. A system for load-testing a cloud radio access network (C-RAN), comprising:
    at least one radio point (RP), each being configured to exchange radio frequency (RF) signals with at least one user equipment (UE);
    a baseband controller communicatively coupled to the at least one RP via a front-haul ETHERNET network; and
    the front-haul ETHERNET network, comprising:
        at least one switch; and
        a testing device that is time-synchronized to the baseband controller and the at least one RP, the testing device being configured to:
            receive at least one received packet from each of the at least one RP;
            replicate at least some of the at least one received packet to produce a respective replicated packet;
            wherein a particular received packet of the at least one received packet is replicated by duplicating the particular received packet to produce a particular replicated packet and adding a delay; and
            transmit at least the particular received packet and the particular replicated packet to the baseband controller.

2. The system of claim 1, wherein the at least one switch comprises a plurality of switches, each being configured to communicate with the baseband controller.

3. The system of claim 2, wherein the at least one RP comprises a plurality of RPs, wherein a first RP sends first packets to the baseband controller via a first switch and not a second switch, wherein a second RP sends second packets to the baseband controller via the first switch and the second switch.

4. The system of claim 3, wherein the first RP has a single ETHERNET port that is used to communicate with the first switch, wherein the second RP is a next generation RP (nRP), wherein the second RP has a first ETHERNET port that is used to communicate with the first switch and a second ETHERNET port that is used to communicate with the second switch.

5. The system of claim 1, wherein the testing device is further configured to change a simulated received signal strength of the particular replicated packet.

6. The system of claim 1, wherein the testing device is further configured to change a simulated RP identification of a simulated RP that received the particular received packet from a UE of the at least one UE.

7. The system of claim 1, wherein one or more of the at least one received packet are not replicated.

8. The system of claim 1, wherein one or more of the replicated packets are not sent the baseband controller.

9. The system of claim 1, wherein the testing device is configured to replicate one or more of the at least one received packet by duplicating one or more of the at least one received packet without modification to produce respective one or more replicated packets.

10. The system of claim 1, wherein each replicated packet appears, to the baseband controller, as coming from one of the at least one RP.

11. The system of claim 1, wherein the testing device is further configured to perform limited simulation, comprising:
    generating at least one Random Access Channel (RACH) request packet, at least one Sounding Reference Signal (SRS) indication packet, or both; and sending the at least one RACH request packet, at least one SRS indication packet, or both to the baseband controller.

12. The system of claim 11, wherein the limited simulation further comprises:
generating at least one Precision Time Protocol (PTP) packet that is not related to Third Generation Partnership Project (3GPP) Long Term Evolution (LTE) or Fifth Generation (5G) standards; and
sending the at least one PTP packet to the baseband controller.

13. The system of claim 1, wherein the testing device is further configured to perform full simulation, comprising:
generating at least one Random Access Channel (RACH) request packet, at least one Sounding Reference Signal (SRS) indication packet, or both; and
sending the at least one RACH request packet, at least one SRS indication packet, or both to the baseband controller.

14. The system of claim 13, wherein the full simulation further comprises:
receiving at least one response packet, from the baseband controller, that was generated in response to the at least one RACH request packet;
generating at least one additional packet in response to the at least one response packet; and
sending the at least one additional packet to the baseband controller.

15. The system of claim 14, wherein the at least one response packet is a Radio Resource Control (RRC) random access response packet.

16. The system of claim 14,
wherein the at least one additional packet is a Physical Uplink Shared Channel in-phase and quadrature (PUSCH-IQ) message;
wherein the testing device is further configured to process additional protocol messages from the baseband controller and exchange additional protocol response messages, on behalf of a simulated UE and a simulated RP, with the baseband controller.

17. The system of claim 13, wherein the full simulation further comprises:
generating at least one Precision Time Protocol (PTP) packet that is not related to Third Generation Partnership Project (3GPP) Long Term Evolution (LTE) or Fifth Generation (5G) standards; and
sending the at least one PTP packet to the baseband controller.

18. A method for load-testing a cloud radio access network (C-RAN) system, the method comprising:
receiving at least one received packet from each of at least one radio point (RP), wherein a testing device is communicatively coupled to the at least one RP via at least one switch in a front-haul network;
replicating at least some of the at least one received packet to produce a respective replicated packet;
wherein a particular received packet of the at least one received packet is replicated by duplicating the particular received packet to produce a particular replicated packet and adding a delay; and
transmitting at least the particular received packet and the particular replicated packet to a baseband controller.

19. The method of claim 18, wherein the at least one switch comprises a plurality of switches, each being configured to communicate with the baseband controller.

20. The method of claim 19, wherein the at least one RP comprises a plurality of RPs, wherein a first RP sends first packets to the baseband controller via a first switch and not a second switch, wherein a second RP sends second packets to the baseband controller via the first switch and the second switch.

21. The method of claim 20, wherein the first RP has a single ETHERNET port that is used to communicate with the first switch, wherein the second RP is a next generation RP (nRP), wherein the second RP has a first ETHERNET port that is used to communicate with the first switch and a second ETHERNET port that is used to communicate with the second switch.

22. The method of claim 18, further configured to changing a simulated received signal strength of the particular replicated packet.

23. The method of claim 18, further configured to changing a simulated RP identification of a simulated RP that received the particular received packet from a UE.

24. The method of claim 18, wherein one or more of the at least one received packet are not replicated.

25. The method of claim 18, wherein one or more of the replicated packets are not sent the baseband controller.

26. The method of claim 18, wherein the replicating comprises duplicating one or more of the at least one received packet without modification to produce respective one or more replicated packets.

27. The method of claim 18, wherein each replicated packet appears, to the baseband controller, as coming from one of the at least one RP.

28. The method of claim 18, further comprising performing limited simulation, comprising:
generating at least one Random Access Channel (RACH) request packet, at least one Sounding Reference Signal (SRS) indication packet, or both; and
sending the at least one RACH request packet, at least one SRS indication packet, or both to the baseband controller.

29. The method of claim 28, wherein the limited simulation further comprises:
generating at least one Precision Time Protocol (PTP) packet that is not related to Third Generation Partnership Project (3GPP) Long Term Evolution (LTE) or Fifth Generation (5G) standards; and
sending the at least one PTP packet to the baseband controller.

30. The method of claim 18, further comprising performing full simulation, comprising:
generating at least one Random Access Channel (RACH) request packet, at least one Sounding Reference Signal (SRS) indication packet, or both; and
sending the at least one RACH request packet, at least one SRS indication packet, or both to the baseband controller.

31. The method of claim 30, wherein the full simulation further comprises:
receiving at least one response packet, from the baseband controller, that was generated in response to the at least one RACH request packet;
generating at least one additional packet in response to the at least one response packet; and
sending the at least one additional packet to the baseband controller.

32. The method of claim 31, wherein the at least one response packet is a Radio Resource Control (RRC) random access response packet.

33. The method of claim 31,
wherein the at least one additional packet is a Physical Uplink Shared Channel in-phase and quadrature (PUSCH-IQ) message;
further comprising processing additional protocol messages from the baseband controller and exchanging additional protocol response messages, on behalf of a simulated UE and a simulated RP, with the baseband controller.

34. The method of claim 30, wherein the full simulation further comprises:
generating at least one Precision Time Protocol (PTP) packet that is not related to Third Generation Partnership Project (3GPP) Long Term Evolution (LTE) or Fifth Generation (5G) standards; and
sending the at least one PTP packet to the baseband controller.

* * * * *